United States Patent Office 3,087,542
Patented Apr. 30, 1963

3,087,542
PROCESS FOR PLUGGING FORMATIONS
Frederick L. Becker, Arnold, and Robert J. Goodwin, Oakmont, Pa., assignors to Gulf Research & Development Company, Pittsburgh, Pa., a corporation of Delaware
No Drawing. Filed Dec. 2, 1958, Ser. No. 777,555
5 Claims. (Cl. 166—29)

This invention relates to a method for plugging or sealing water-bearing formations and to a method particularly suited for plugging formations penetrated by the borehole of a gas or oil well.

Frequently the inflow of water into the borehole of a well interferes seriously with the operations performed on the well. For example, in the drilling of a well using a gaseous circulating medium to remove the cuttings an inflow of water into the borehole will cause balling of the cuttings which may cause sticking of the drill pipe. If the inflow is very high, it is usually necessary to convert the drilling operation to one using mud as a circulating medium.

The inflow of water into the borehole of a producing well is just as undesirable. The presence of water may cause serious corrosion of the tubing in the borehole. Emulsions of water and oil that are extremely difficult to break may be formed. There are the added objections that the water flowing into the borehole must be pumped from the well, thereby increasing the pumping costs, and must be disposed of after it is separated from the oil at the well head.

Extensive research work has been performed on methods of plugging permeable formations and particularly to sealing water-bearing formations. Many of the methods that have been developed require the successive displacement of two or more liquids into the formation with the object of causing the liquids to react in the formation to form a precipitate which plugs the formation. Ordinarily such processes are not successful in effectively plugging the formation. The second liquid merely displaces the liquids previously in the formation. Reaction then occurs only at the interface of the two liquids; hence, little reaction forming the necessary precipitate occurs. The same problem arises when a single liquid is displaced into the formation to react with naturally occurring waters already in the formation. It has been suggested that liquids capable of setting to form plastics be displaced into the formation. The displacement of such liquids must be made at conditions controlled within narrow limits. If setting proceeds too rapidly, the plastic sets in the borehole and cannot be displaced into the formation. If the setting proceeds at too slow a rate, costs resulting from loss of operating time are incurred.

Another method that has been suggested for plugging a formation is to inject hydrogen fluoride directly into the formation. This method is limited to formations rich in silica and having low permeabilities. Because the reaction of the hydrogen fluoride with the silica in the formation is slow, the treatment ordinarily requires from two to five hours.

This invention resides in a process for plugging permeable water-bearing formations in which gaseous silicon tetrafluoride is displaced into the water-bearing formation. The gaseous silicon tetrafluoride threads its way through the formation without displacing a large amount of the water from the interstices therein and thus reacts with the undisplaced water to form a solid material in the pores through a substantial depth of the formation. The term "solid" when used to describe the product of the reaction of the gas with water refers to both precipitates and gels. The essential characteristic of the reaction product is that it offer sufficient resistance to flow to plug the formation.

It has been found that if gas is displaced into a permeable formation containing a liquid, the gas will finger or thread its way through the formation leaving a large part of the liquid in place. In contrast, when a first liquid is injected into a formation containing a second liquid, the first liquid almost completely displaces the second liquid in the formation which permits only a very small amount of mixing of the two liquids and this occurs substantially only at the interface. If the gas displaced into the formation is capable of reacting with the liquid in the formation, the reaction will occur for a substantial depth through the formation. In this invention, a gas capable of reacting with water to form a solid is displaced into a formation containing water to form a solid in the pores for a substantial depth in the formation thereby forming an effective seal capable of withstanding the potential differential pressure the fluids in the formation can exert. This invention is of greatest utility in plugging formations normally containing water. It can also be used in plugging permeable formations which do not normally contain water, for example thief zones in gas injection wells, by a prior displacement of water into the formation followed by displacement of the gas. The important advantage of a single step process is lost in applications of the invention requiring an initial injection of water; however, injection of water is generally easier and cheaper than injecting other reacting liquids required by other processes.

The compound which can be used effectively in the process of this invention is gaseous at the conditions of temperature and pressure existing in the formation to be plugged and reacts with water at such temperature and pressure to form a solid material. Silicon tetrafluoride is an especially desirable compound for use in this invention because of its volatility and the rapidity with which it reacts with water to form a precipitate.

The amount of silicon tetrafluoride gas required to form an effective seal will depend upon the pressure on the formation and to some extent on the porosity and permeability of the formation. The reaction of silicon tetrafluoride with water in the water-saturated formation for a depth of six inches into the rock surrounding a nine inch borehole should be sufficient to plug the formation satisfactorily. In laboratory tests, a plugged zone about three inches deep has satisfactorily withstood a differential pressure of 1000 pounds per square inch. Also, plugged cores of four inches in length have satisfactorily withstood differential pressures of as high as 4000 pounds per square inch. From 10 to 20 pounds of silicon tetrafluoride per foot of hole treated is adequate. The quantity required depends on both the porosity and the uniformity of permeability of the formation.

For convenience in describing the process of this invention, the plugging of a formation penetrated by the borehole of a well by the injection of silicon tetrafluoride will be described. If a formation is to be plugged during the drilling of a well, the zone of water inflow is usually known from the initial appearance of the water, but if not known, it can be located by any of the conventional means, such as electric or radio activity logs, temperature logs, or flow surveys. That zone is then preferably isolated by suitable packers and silicon tetrafluoride displaced down the well into the isolated zone of the water-bearing formation. The silicon tetrafluoride threads its way through water in the isolated zone of the formation and reacts with the water to form a precipitate throughout a substantial depth of the formation. Completion of the process is indicated by an increase in the pressure required to displace the silicon tetrafluoride into the formation. On release of the pressure on the isolated zone of the well, the precipitate formed by the silicon tetrafluoride plugs the openings preventing flow of water into the borehole.

In order to prevent the formation of a precipitate on the borehole wall which will make displacement of silicon tetrafluoride into the formation difficult, it is desirable to displace water from the borehole before the injection of the silicon tetrafluoride. This can be accomplished by displacing ahead of the gas a slug of oil or other non-aqueous fluid sufficiently large to fill the isolated portion of the hole to displace the water from the borehole. The silicon tetrafluoride then follows the oil into the hole and then into the formation and threads its way through the oil and water to react with the water and form the precipitate.

A preferred method of carrying out the process of this invention is to displace water from the isolated zone with a non-reactive liquid such as diesel oil. The inert fluid, in addition to displacing water from the borehole, also displaces water from the rock pores immediately adjacent to the well bore. Silicon tetrafluoride gas can then be displaced into the formation and react with water for a substantial depth through the formation without having a precipitate build upon the face of the borehole which can limit the gas injection. The viscosity of the oil can be varied to help achieve uniformity in the amount of gas injected into each zone of different permeability where the permeability is not uniform from one vertical section of the hole to another. The oil can also be injected in several small slugs during the gas injection to help adjust for such non-uniform zones. An inert gas such as air or natural gas can also be used to displace water from the borehole and face of the formation ahead of the reactive silicon tetrafluoride gas.

In some instances the pressure on the formation to be plugged may be such that there is a possibility that the compressed silicon tetrafluoride gas density would be too high. Excessive density of the gas interferes with displacement of water from the borehole with a slug of non-aqueous liquid. Any possibility of excessive compressed gas density can be avoided by diluting the reactive silicon tetrafluoride gas with a gas such as air, nitrogen or a lease gas to form a gaseous mixture in which the density is lessened to the desired extent. In some cases it may be desirable to precede and/or follow the silicon tetrafluoride gas into the tubing or drill pipe with rubber plugs to separate the silicon tetrafluoride gas from the other fluids in the pipe. In such cases, water could be used to displace the silicon tetrafluoride gas from the tubing or drill pipe into the formation.

The following examples illustrate the plugging of permeable formations by precipitating a solid in the formation.

EXAMPLE 1

A block of Berea sandstone, 10" x 10" x 3", was drilled to form a hole one inch in diameter through the center of the block. Steel tubing perforated along part of its length was placed in the hole and cemented at the top and bottom. Metal cement retaining washers were placed beneath and immediately in contact with the cement at top and bottom to prevent cement from entering the borehole. The block was placed in a pressure cell and saturated with water at 200 p.s.i.g., and the water permeability was determined to be 159 millidarcies by flowing water through the four exposed faces of the block and out through the perforated tube. Then sufficient oil was injected into the perforated tube to fill the one inch borehole which was immediately followed by 30 grams of 99.5% purity $SiF_4$ at a maximum differential injection pressure of 100 p.s.i. The injection of gas was stopped when a pre-chosen differential limit of 100 p.s.i. was reached. The hole in the block was vented to the atmosphere and a pressure of 1,000 p.s.i.g. was imposed on the outer periphery of the block to measure the effectiveness of the plugging.

EXAMPLE 2

The procedure described in Example 1 was followed with the exception that a maximum differential pressure of 120 p.s.i. was used during the injection of silicon tetrafluoride, and 40 grams of silicon tetrafluoride were used in a block having a water permeability of 206 millidarcies.

EXAMPLE 3

A core of Berea sandstone one inch in diameter and three inches long was placed in a coreholder of conventional design (Hassler Cell) and flooded with water to saturate it. After the core was saturated, its water permeability was determined to be 552 millidarcies and immediately thereafter air was passed through the core in sufficient quantity to establish gas permeability therethrough. Next, $SiF_4$ was passed through the core until a pre-chosen differential pressure of 100 p.s.i. was reached. The effectiveness of the water shut-off was determined by applying a differential pressure with water of 400 p.s.i. to the core.

EXAMPLE 4

A core of Berea sandstone one inch in diameter and three inches long was placed in a coreholder of conventional design (Hassler Cell) and flooded with water to saturate it. After the core was saturated, its water permeability was determined to be 204 millidarcies. The core and holder were then placed in a constant temperature bath and raised to the bath temperature of 150° F. Sufficient air was then injected to establish gas permeability and followed immediately by 1.42 grams of $SiF_4$. The $SiF_4$ injection was stopped when a pre-chosen differential limit, necessary to maintain injection, of 50 p.s.i. was reached. The effectiveness of the water shut-off was determined by applying a differential pressure with water of 100 p.s.i. to the core; the apparatus and core still being maintained at 150° F.

EXAMPLE 5

A well prepared for testing of the silicon tetrafluoride water shut-off method was drilled to 412 feet and 5½ inch casing cemented at that depth. Air drilling with a 4¾ inch bit was started at 412 feet and at 425 feet water appeared in the air returns. Drilling was continued to a depth of 433 feet. Packer and tubing were then run to the bottom and water production measured at 375 gallons per hour while reverse circulating air at about 80 p.s.i. surface casing pressure.

After measuring the water production rate and producing water to clean up the hole, the packer was set in the casing at 404 feet so that the bottom of the tail pipe would not extend below the casing point. The annulus above the packer was next filled with water. The treatment was then started by putting 45 gallons of diesel oil into the tubing and following this with a slug of nitrogen to displace water from the hole and prevent premature reaction of the silicon tetrafluoride with water at, or near, the face of the well bore. The difference in viscosities of the nitrogen and diesel oil relative to the water in the hole should have helped to correct for suspected large permeability variations in the formation and should have thus uniformly cleared the hole of water. After the oil and nitrogen were injected, the silicon tetrafluoride gas was injected. A record of both the gas pressure in the silicon tetrafluoride gas cylinders and the weight of the cylinders indicated that the injection of the gas proceeded at a reasonable rate. A total of 193.5 pounds of $SiF_4$ was injected into the well and tubing, followed with a slug of nitrogen. Maximum surface injection pressure was 280 p.s.i.g. which occurred when the hole was full of gas. At the time injection was stopped, approximately 25 pounds of $SiF_4$ remained in the tubing and open hole. Subsequent water production tests made by reverse circulating air at 40 p.s.i. indicated a water production of 8½ gallons per hour.

EXAMPLE 6

A saturated sodium silicate solution was injected into a 5″ x 5″ x 2″ block of Berea sandstone with a ½ inch hole through its center and arranged as described above for the 10″ x 10″ x 3″ block and placed in a test cell to fill the pores of the block with the solution. The rate of water flow through the 250 millidarcy permeability block under a differential pressure of 150 p.s.i. had previously been established. A concentrated aqueous solution of calcium chloride was then injected into the test block. Considerable difficulty was encountered in causing initial flow of the calcium chloride into the test block, probably because of blocking the walls of the borehole with a thin film of precipitate. After flow into the test block had commenced, the calcium chloride largely displaced the sodium silicate solution unreacted from the test block. The hole in the block of Berea sandstone was vented to the atmosphere and a water pressure of 150 p.s.i.g. was imposed on the outer periphery of the block and the rate of flow of water through the block determined to measure the efficiency of the plugging. The results of the examples are presented in Table I.

Table I

| Example No.: | Percent water shut-off achieved |
|---|---|
| 1 | 97.8 |
| 2 | 99.0 |
| 3 | 99.9 |
| 4 | 99.5 |
| 5 (field test) | 98.0 |
| 6 | 56.0 |

A comparison of the results for the different examples presented in Table I shows that the injection of a gas capable of reacting with water in the formation provides highly effective sealing of the permeable formation. Whereas the successive injection of a saturated sodium silicate solution and a calcium chloride solution only resulted in a 56% reduction in the rate of water flow through the core, this invention allows substantially complete water shut-off to be obtained. The preferred embodiment of this invention in which a non-reactive liquid is displaced into the formation ahead of the reactive silicon tetrafluoride gas resulted in substantially complete water shut-off.

We claim:

1. A process for plugging a permeable formation penetrated by the borehole of a well to prevent flow from the permeable formation into the well comprising pumping water down the borehole of the well, displacing said water from the borehole of the well into the permeable formation adjacent the borehole of the well with a fluid substantially immiscible in the water, and then displacing a gas consisting of silicon tetrafluoride down the borehole of the well and into the formation whereby the silicon tetrafluoride reacts with water in the formation adjacent the borehole to plug the formation.

2. A process for plugging a permeable formation containing water to prevent flow of water from the permeable formation through an exposed surface thereof comprising displacing water from the exposed surface of the formation, then displacing a gas consisting of silicon tetrafluoride through the exposed surface into the formation whereby the silicon tetrafluoride reacts with water in the formation adjacent the exposed surface to form a solid material plugging the formation.

3. A process for plugging a water-bearing formation penetrated by a borehole to prevent flow of water from the water-bearing formation into the borehole comprising displacing a hydrocarbon liquid down the borehole and into the formation to remove water from the borehole and displace it into the formation adjacent the borehole, and then displacing a gas consisting of silicon tetrafluoride down the borehole and into the formation whereby the silicon tetrafluoride reacts with water in the formation adjacent the borehole to form a solid material plugging the formation.

4. A process for plugging a water-bearing formation penetrated by a borehole to prevent flow of water from the water-bearing formation into the borehole comprising displacing an inert gas down the borehole and into the formation to remove water from the borehole and displace it into the water-bearing formation adjacent the borehole, and then displacing a gas consisting of silicon tetrafluoride down the borehole and into the formation whereby the silicon tetrafluoride reacts with water in the formation adjacent the formation to form a solid material plugging the borehole.

5. A process for plugging water-bearing formations of different permeabilities penetrated by the borehole of a well to prevent flow of water from the water-bearing formation into the well comprising displacing a hydrocarbon liquid down the well and into the water-bearing formations, following the hydrocarbon liquid down the well with an inert gas, displacing the hydrocarbon liquid and inert gas into the water-bearing formations whereby water is displaced from the borehole, displacing a gas consisting of silicon tetrafluoride down the well and into the water-bearing formations whereby silicon tetrafluoride reacts with water to precipitate silica in the formation and thereby plugs the water-bearing formations.

References Cited in the file of this patent
UNITED STATES PATENTS

| | | |
|---|---|---|
| 1,990,969 | Wilson | Feb. 12, 1935 |
| 2,019,908 | Kennedy et al. | Nov. 5, 1935 |
| 2,146,480 | Kennedy | Feb. 7, 1939 |
| 2,259,875 | Bent et al. | Oct. 21, 1941 |
| 2,469,354 | Bond | May 10, 1949 |
| 2,633,919 | Bauer | Apr. 7, 1953 |
| 2,693,857 | Marshall | Nov. 9, 1954 |
| 2,846,012 | Lorenz | Aug. 5, 1958 |